Patented Sept. 13, 1932

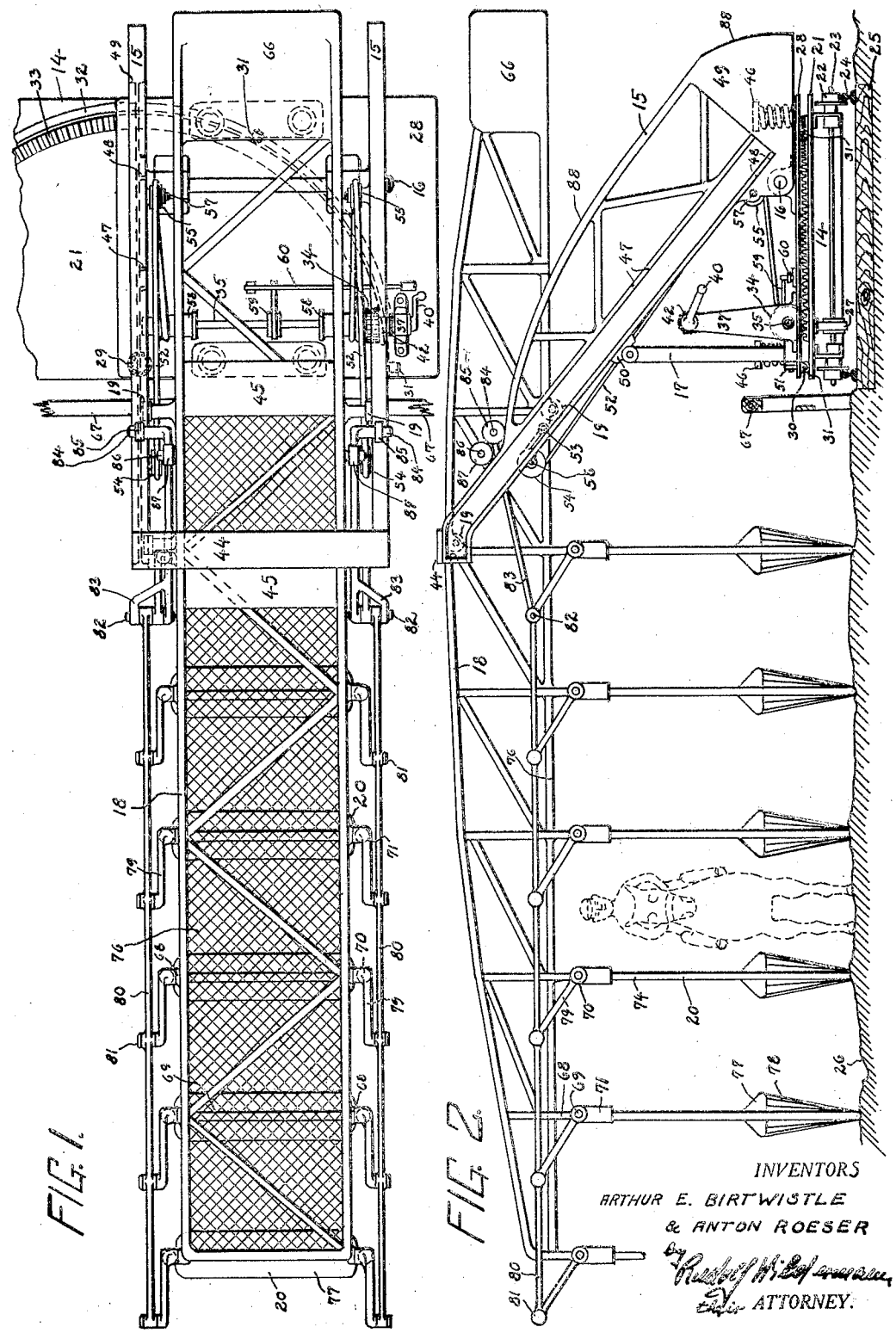

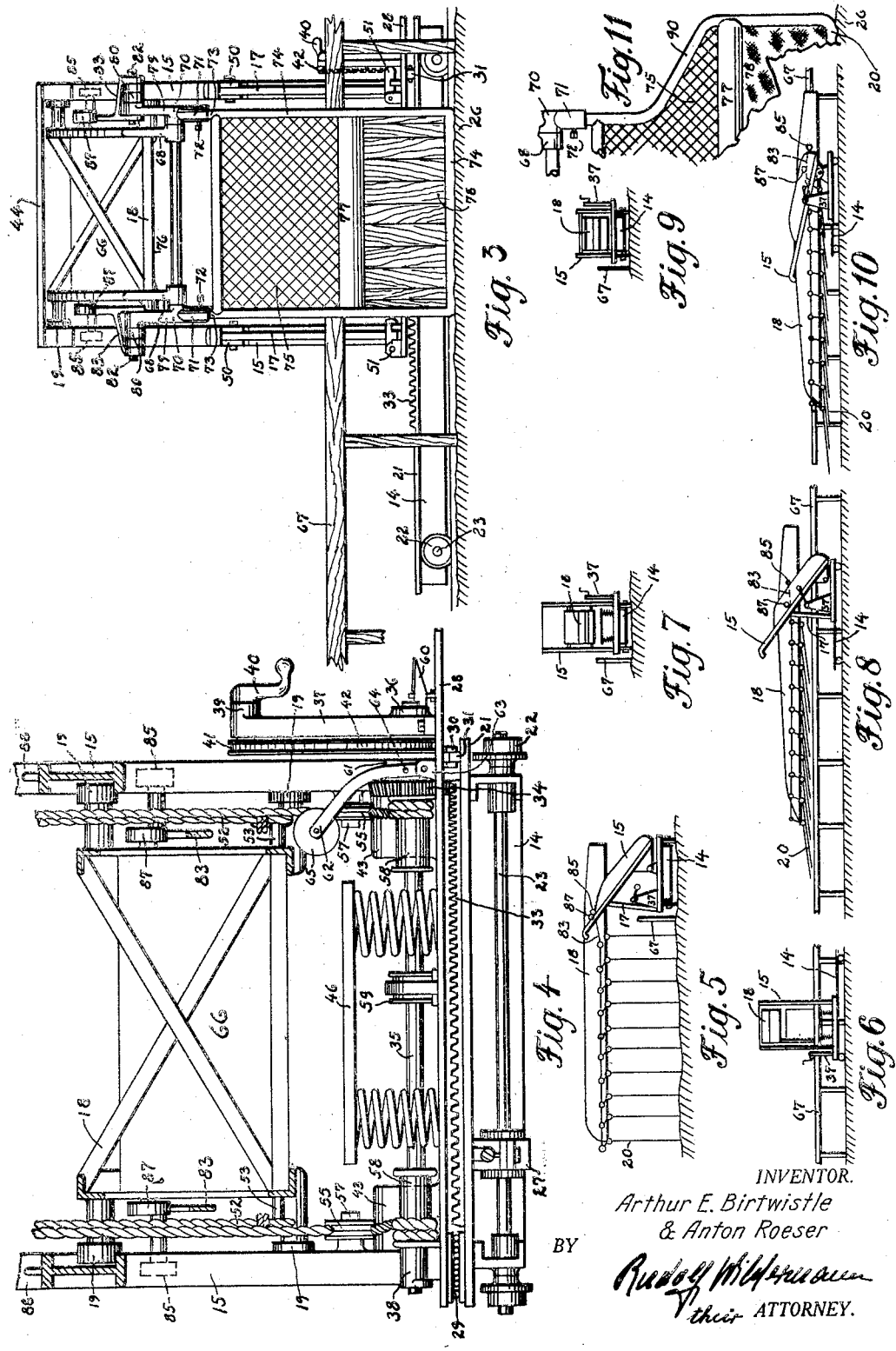

1,876,839

UNITED STATES PATENT OFFICE

ARTHUR E. BIRTWISTLE AND ANTON ROESER, OF BROOKLYN, NEW YORK

STALL GATE FOR RACE TRACKS

Application filed December 21, 1929. Serial No. 415,700.

Our invention relates to stall gates for race tracks. It is particularly intended for the use at the start in connection with horse races.

It has been realized for a long period of time by those interested in horse races that it is of vital interest to provide proper means at the starting point to avoid the many troubles and accidents which are apt to occur and which very often do occur, because the horses are not properly aligned or kept apart.

It has been the object of our invention to overcome the short-comings of the methods used at the present time to properly start off races and some of the objects of our invention are, first, to separate, at the starting point of a race, the horses from each other so that they cannot excite, annoy or harm each other; second, to provide stall gates which are firmly and solidly disposed at the starting point of a race; third, to confine in a vertical direction, the stalls for horses at the starting point on a race track so that the horses are prevented from rearing; fourth, to construct the walls confining the stalls and the collateral structure in such a manner, that the view of the spectator is obscured as little as possible; fifth, to provide means on the individual stalls preventing the horses from engaging their feet below the partitions, or upon the walls of the stalls when they try to rear; sixth, to provide means on stalls, which discourage kicking by the horses, without harming them; seventh, to remove the stall gates in the shortest possible time from the race track, after the start, so that, on an endless track, the track is free, when the horses pass the starting point later on; eighth, to bring about said removal of the stall gates in such a manner that there remains no obstruction above or on the race track, nor any fastening or anchoring means in the soil of the track; ninth, to remove the stall gate in such a manner and to such an extent, after the start, that it will be practically removed from view, and that it will not even throw a shadow upon the track; tenth, to collapse the gate in a narrow, longitudinal space besides the track, after it has been removed, so that a minimum amount of space is required for our stall gate when out of use; eleventh, to provide means for repositioning the stall gate, within a short period of time, when one race has been finished and the next one is to be begun; twelfth, to provide means for shifting the position of the stall gate beside the track, so that the start may be arranged at any point of the track; thirteenth, to be able to operate our stall gate without prime movers or motors, by simple operations of one or two men; fourteenth, to collapse the partitions of the stalls during the removal in such a manner that they clear, and pass above the fences or rails bordering the track; fifteenth, to allow the collapsing of the partitions of the stalls, the removal of the gate from the track, and the vertical collapsing of the whole structure of the gate by one simple, single operation; sixteenth, to use the weight of the gate to expedite its removal from the race track; seventeenth, to swing the gate off the track and, successively, to collapse it beside the track; eighteenth, to include in the operation of the gate means for anchoring the lower ends of the partitions separating the stalls in the soil of the track, when the gate has been brought into operative position; but no harmful marks or disarrangement of the level of the track are caused by such anchoring; ninteenth, to simplify the construction of our stall gate in such a manner that it obviates care and attention and is foolproof in its operation; and twentieth, to protect the jockey as well as the horse at the starting point of a race.

These and other objects we attain by the mechanism illustrated in the accompanying drawings in which, Figure 1 shows a top view of the device of our invention. The improvement is in operating position on the race track.

Figure 2 shows a corresponding front view in the direction of the race track.

Figure 3 shows a corresponding side view, looking upon the device from a side opposite to the one from which it overhangs the track.

Figure 4 shows a sectional, sectioned and enlarged side view taken in the same direction as Figure 2, the device being sectioned substantially along a vertical plane right in front of the supporting truck; this view shows the upper part of the device in an intermediary operating position, swung through 90°, off the track.

Figure 5 is a schematic front view, corresponding to the view of Figure 2, showing the device in operative position.

Figure 6 is a corresponding schematic side view of the device in operative position, this view being taken from the side upon which the stall gate is supported beside the track.

The schematic views of Figures 7 and 8 are taken in directions corresponding to the views of Figures 5 and 6, respectively. They show the device in an intermediary position after it just has been swung away from the track; this position of the device corresponds to that of Figure 4.

Figures 9 and 10 are schematic views taken in the direction of the views of Figures 5 and 6, respectively, and show the device at rest, when not in operation, besides the track.

Figure 11 is a side view of a modified part of the partition.

Similar numerals refer to similar parts throughout the various views.

From an engineering point of view our invention resembles a crane which may be classified as a rotary gantry; it is essentially made up of four elements, a truck 14, jibs 15 journaled upon the truck in pintle 16 and supported by struts 17, a boom 18, the rollers 19 of which run in channeled sections of the rails of the jibs 15, and the partitions 20 swingably suspended from the boom 18.

The truck 14 has a top 21; in the understructure below are journaled the shafts 23 with car wheels 22 at their ends. Beside the race-track 26, on the infield, on the outfield, or on both fields, the steel rails 24 are mounted upon a suitable base 25. Upon these rails the truck 14 is arranged to run back and forth besides the race-track and a small brake 27 is arranged upon the understructure of the truck by means of which the truck carrying the stall gate may be located in any fixed position beside the race-track, said brake 27 serving to lock the shafts 23 upon which are fastened the wheels 22.

Upon the top 21 of the truck 14 is rotatably mounted the platform 28. At the axis, around which the platform 28 is adapted to rotate, the platform 28 is supported upon the top 21 by a suitable thrust, roller- or ball-bearing 29. At suitable points below the platform 28 are mounted thereon brackets 30 which contain rollers 31. In the drawings we show just two such brackets and rollers, which, in conjunction with ball bearing 29, represent triangularly arranged means of support, the rollers 31 resting upon the top 21 of the truck in a circular track 32 along which they are adapted to roll when the platform is rotated around its fulcrum at the center of the ball bearing 29. Of course a multiplicity of rollers 31 may be arranged below the platform to run along track 32, so as to afford additional means of support for the platform 28. Other rollers of this kind may be fastened underneath the platform, which additionally support the platform but which run in other tracks in the top 21 of truck 14 which tracks are concentric to the track 32. Rollers or balls directly located between the top and the platform and retained in suitable recesses or races on the respective top and bottom sides may, of course, as mechanical equivalents, take the place of the rollers 31 on brackets 30. From the top 21 of the truck 14 extend upward a plurality of teeth which make up the sector 33 of a bevel gear concentrically disposed in respect to the ball bearing 29 and the track 22. A bevel gear 34 complementarily engages the sector 33. The bevel gear 34 is rotatably mounted and thrustwise restrained upon the shaft 35 which is journaled at one end in a bear 36 near the lower end of stand 37 upon the platform, its other end being rotatably supported by a bracket 38 on the other side of the platform. At its upper end stand 37 has another bearing 39, on which is journaled a shaft which carries on one end a crank handle 40 and on the other end a sprocket 41. There is a similar sprocket mounted on shaft 35 in alignment with sprocket 41 and said sprockets are connected by the endless chain 42, so that operation of crank handle 40 will rotate shaft 35. Two bearings 43 are mounted upon the sides of the platform. In these brackets is journaled the pintle 16 extending therethrough from the two jibs 15. These two jibs are connected by a cross bar 44 at their upper ends; otherwise the space between them is clear, providing an opening in which the boom 18 moves up and down. The rails of the jibs 15 are provided with channel-shaped troughs which face each other and which rectilinearly extend along substantially the whole length of the jibs. But at their upper ends, below the connecting cross bar 44, said troughs have a slight kink so that the upper rollers 19 on boom 18 are guided to move for a short distance in horizontal direction when the boom reaches its highest position of movement along the channels in the jib rails. There are solid cross pieces 45 upon the lower side of the boom 18; these cross pieces 45 come to rest upon the compression-spring-supported cushion plates 46 extending upward from the platform 21, when the boom reaches its lowest point of travel along the jib rail. When the boom rests solidly upon the cushion plates 46, its upper and lower rollers 19 are in alignment with clearance openings 47 and 48 in the upper and lower edge, respectively, of the channel-shaped trough of the jib rail. The jibs 15 are counterbalanced at their lower ends by counterweights 49 which tend to retain the jibs in the position shown in Figure 2. But when the boom 18 is in its lowest position along the jib rails resting upon the cushion plates 46, the struts 17, hinged upon the jibs in brackets 50, can at their lower ends be brought out of engagement with catches 51, which retain said lower ends upon the platform; then the struts can be folded back, the jibs can be rotated around the pintle 16, the rollers 19 on the boom passing through the clearance openings 47 and 48 and the jib rails come into an almost horizontal position, the cross bar 44 coming to rest upon the top of the boom 18. The counterclockwise rotation of the jibs causing a lateral displacement of the counterweight 49, the weights of the jibs on both sides of the pintle are arranged in such a manner that the parts of the jibs, extending to the left of the pintle outweigh the parts to the right of the pintle when the jib rails are in the substantial horizontal position described, whereas the weight of the jibs is slightly heavier to the right of the pintle than to the left of the pintle when the jibs are in the position of Figure 2.

The hoisting ropes or cables 52 are attached to pins 53 extending from the sides of the boom. These ropes extend around sheaves 54 and 55 journaled upon pins 56 and 57, respectively, mounted near the bottom sides of the rails of the jibs 15. From the lower sheaves 55 the ropes pass onto winches 58 which are solidly mounted upon the shaft 35. A brake 59 is also mounted upon shaft 35; the brake lever 60 extends in a direction substantially parallel to and upon the approximate level of said shaft 35 to a point alongside of the stand 37, where it is subject to the control of the foot of the operator and where a catch is provided for to permanently lock the brake, so that the operator of the stall gate has at his disposition, alongside of the crank handle 40, a brake by means of which he can temporarily retard and restrain the rotation of shaft 35; or he may thereby lock said shaft permanently.

It has been stated above that the bevel gear 34 is rotatably mounted but thrustwise retained upon the shaft 35. Alongside of the bevel gear 34 there is slidably keyed onto shaft 35 a pin clutch 61, the pins of which are adapted to engage suitable openings in the bevel gear 34. The engagement and disengagement of the pin clutch 61 in bevel gear 34 is controlled by the forked lever 62 which is fulcrumed in a bracket 63 mounted on the top of the platform 21. The forked lever 62 engages a cylindrical annular groove in the pin clutch 61 by means of pins 64 extending thereinto and upon the free end of lever 62 is journaled a roller 65. That roller normally extends partly below the boom 18 so that it is struck by the boom, when it is lowered below the position indicated in Figure 4. The boom pushes the roller 65 out of its way, when it is brought still further down; then the forked lever swings to the right, the pin clutch is disengaged from the bevel gear 34 and said gear is not operatively connected any more to the shaft 35.

The boom 18 is a structural steel beam with a counterweight 66 at its right end. When the device is in the operating position of Figure 2, the greater part of the boom 18 extends over the fence 67 onto the track. From the part of the boom, which thus overhangs the track, extend downward a series of extension brackets 68 on both sides of the boom. In these extensions are journaled the shafts 69. Upon the ends of the shafts 69 are fixedly mounted the double levers 70. The vertical arms 71 of these double levers are hollow and by means of set screws 72 on the sides thereof the extensions 73 on the upper ends of the gates 20 may be set in said vertical arms at a higher or lower position, according to the distance to which the partitions are to extend downward from the boom to bring them into contact with the track. Frames 74 extend around the partitions, representing structural parts thereof. The upper section of said frame of the partitions is open and a screen 75 of wire mesh is mounted therein, to bring about the desired physical separation of adjoining stalls from each other. A screen 76 consisting of similar wire mesh, is mounted upon the bottom side of the boom, extending above all the stalls confined by the partitions 20. This screen 76 serves to prevent the horses from rearing which would have the undesirable consequence of having the horse fall over backwards.

At its lower end the screen 75 merges into a dashboard 77 which is preferably made of suitable, strong metal. It is smooth on its top and flared downwardly, on both sides of the screen, so that the hoofs of an unruly horse, when they come down on this dashboard, will slide off, so that it cannot support itself thereon, but has to stand on the ground. The bottom sides of the dashboards 77 merge into straight walls 78, which extend from said dashboards to the bottom cross pieces of frames 74. These walls, on both sides of the partitions converge towards the bottom and they are preferably made of strong wooden boards (Fig. 3), or rugged matting (Fig. 11) forming a padding 78 on which it is impossible for the horses to hurt themselves by kicking and which are strong enough to form a permanent wall on the lower sides of stalls. Since the round frame 74 extends along the bottom of the partitions, the smooth curvature thereof prevents the hoof of a horse from being caught thereunder.

Figure 11 shows a modified execution of the partition shown in Figure 3. According to this view I may extend the dashboards 77, on one side, beyond the upper width of the partition, the padding 78 below said dashboards (which is here shown made out of rugged matting) correspondingly extending to the right. The frame 74, instead of extending straight downward from the vertical arms 71 of the double lever 70, is curved to the right, where it borders the screen 75, so that it surrounds the widened lower part of the partition. The inclined part 90 of the frames 74 thus upwardly borders the protruding part of the partition and it is arranged at a height which allows the head of a race horse to be seen thereabove, so that the spectators in the grand stand, which is ordinarily arranged next to the track upon the outfield, obtain a full view of the head of the horse standing in the stall and of the jockey riding the horse. When the stall gate is constructed in this manner the width of the boom and, correspondingly, the width of the whole stall gate, may be reduced, the width of the lower part of the partition in Figure 11 being approximately that of the width of the partition of Figure 3.

Arms 79 extend, at an angle upwardly, from the double levers 70 and the free ends of these several arms 79, thus extending upward from the various partitions 20, are hinged by pivots 81 upon a connecting rod 80 which extends transversely. The last lever arms 79 are hinged upon the right end of the connecting rods 80 by means of shafts 82, upon which also hinge the forked levers 83. The free ends of levers 83 carry upon pivots 84 the rollers 85; from the sides of the boom 18 extend laterally the pivots 86 upon which are mounted the two rollers 87 against the bottom sides of which rest flat parts of the forked levers 83. The upper sides of the jibs 15 represent track-like cam arms 88 which form part of the structural frames making up the jibs, and upon which rest the rollers 85. At their lower ends the cam arms 88 extend in circular curves around the pintle 16. When the boom 18 slides downward from its top position along the rails of the jibs, the rollers 85 roll onto the cam arms 88; their upward movement is restricted by the rollers 87 so that the forked levers 83 move towards the right, pulling with them the connecting rods 80, thus bringing about a clockwise rotation of the double levers 70. This causes the partitions to swing from their vertical position towards the left, upwards, until they reach a substantially horizontal position, the various partitions being folded up and resting against each other, when the rollers 85 have rolled onto the straight parts of the cam arms 88.

The operation of our stall gate may be best described, starting out from the position of Figures 1, 2 and 3, i. e., the operative position of the stall gate. By means of the brake 59 the operating shaft of our device is locked in position. When the brake is unlocked, and the shaft 35 is thus released, the weight of the boom will have a tendency to cause it to roll, by means of rollers 19, downward along the rails to the jibs. If this downward movement of the boom by its own weight should be too fast, the operator may retard this downward movement by operating the brake lever 60, since the hoisting ropes or cables 52 connect the boom to the shaft 35. Said hoisting ropes or cables are unwound from the hoisting drums on shaft 35, when the boom moves downward along the rails of the jib.

At the beginning of the downward motion of the boom only the lower roller 19 moves downward, whereas the upper rollers 19 move horizontally along the short horizontal portions at the upper ends of the troughs in the rails of the jibs. The respective motions of the two, upper and lower, sets of rollers 19 will cause a slight tilting of the boom in a direction of clockwise rotation, until the upper rollers 19 have rolled into the long, straight, inclined portions of the troughs in the rails of the jibs, in which the lower rollers move all the time. By the clockwise tilting of the boom, the lower ends of the partitions 20, which have been more or less engaged upon, or buried in the soil 26 of the track, are lifted out and away from said soil.

As the boom continues to travel downward the cam parts 88 of the jibs will force the rollers 85 to move to the right at a rate of speed greater than that at which the boom itself moves to the right, the upward movement of the levers 83 being prevented by the rollers 86, which are stationarily mounted on the sides of the boom, and along the lower periphery of which the levers 83 travel as the roller 85 is pulled to the right by the cam part 88 of the jibs. This movement of the lever 83 to the right, at a speed exceeding that of the corresponding movement of the boom, will pull the rods 80 in the same direction so that the levers 89 are pulled in clockwise rotation, causing the partitions 20 to swing up, in clockwise rotation, until they are folded, almost flat, against the bottom of the boom, when the boom is moved downward along the rails of the jibs so far that the rollers 85 have rolled onto that part of the cam part 88 which is parallel to the troughs in which the rollers 19 are rolling. It is observed that between the upper edge of the screen parts of the partitions and the shafts 69, around which the partitions are arranged to swing, there is a clearance space, in which the dashboards of the adjoining partitions are accommodated, when the partitions are folded against the bottom of the boom.

When the boom has been lowered into its lowest position of rest upon the cushion plates 46, the rollers 85 have reached the end of the straight section of the cam parts 85 and are about to pass onto the curved sections of the cam parts 88, which sections are arranged circularly around pintle 16. If therefore, at this point of the operation, the struts 17, which support the jibs, are disengaged from the catches 51, and the jibs are rotated in counterclockwise rotation, the openings 47 and 48 clearing the rollers 19, the rollers 85 will roll along the circular sections of the cam parts 88, the levers 83 being retained in substantially the same position with respect to the boom, and the partitions therefore being retained in their prior position.

It will be observed that in the operation of collapsing our stall gate the full weight of the boom, together with that of the partitions suspended therefrom, is not lowered as such, while the boom moves down along the troughs in the jibs. The partitions have considerable weight and while the boom is lowered, they swing upward, thereby making the net amount of weights actually shifted during the lowering operation of the boom a comparatively small one. The degree in which the swinging upward of the partitions counterbalances the descending weight of the boom can readily be controlled and adjusted by modification of the curvature of the upper end of the cam part 88. The weight of the descending boom thus being compensated, it will be understood that the operator of the device will not have to lift the actual and full weight of the boom and of the partitions from the collapsed position to the operative position when he returns the stall gate by operation of the windlass. We choose however to balance weights during the lowering and raising operations in such a manner that the lowering proceeds quicker than the raising. Thus the stall gate can be removed in a very short period of time from the track; and that may be vital and important, when the endless track is small and when the racing horses pass the starting point within a short period of the time after the start.

In the description of the collapsing of the stall gates and of the operation of returning it into an operative position we have, up to this point, entirely ignored the swinging of the stall gate around a vertical axis simultaneous with those operations. The shaft 35, on which the windlass is mounted, is directly geared, by the bevel gear 34, to the sector 33. When the shaft 35 is rotated by the weight of the descending boom in the collapsing operation, or by the operation of the crank, when the stall gate is to be brought into operative position, the platform 28 will rotate around the center of the ball bearing 29. The partitions 20 being lifted up while the boom descends, they clear the rail or fence 67 when the boom, during the rotation of the platform, swings over said fence, until the boom, from a position of extending at right angles over the track has been swung into a position parallel with and, beside the track. When the boom reaches this position it still is a certain distance above its lowest, fully collapsed position, and, the platform, still being geared to the truck, upon further lowering of the boom would continue to swing around a vertical axis, away from its position parallel to the track, if the said swinging operation would not be interrupted.

This interruption is brought by disconnecting shaft 35 and sector 33 at this point of the operation. When the boom has been swung to a position parallel to the race track, it has been lowered so far, that its lower edge strikes the roller 65 on the forked bracket 62. It pushes that roller aside and the forked bracket, swinging in clockwise direction, pulls the pin clutch 61 out of engagement with the bevel gear 34 so that the platform with the boom will not rotate any more while the lowering operation of the boom is continued, but it will remain in a position parallel to the track. Shortly after that the boom comes to rest upon the cushion plate 46, the tension of which may be balanced in such a manner that it offsets and counterbalances, to a great extent, the descending weight of the boom and of the partitions. When therefore the operator desires to bring the stall gate from a fully collapsed position back into its operative position he will not have to lift the full weight of the boom but the lifting operation will be greatly facilitated by the counteraction of the cushion plates 46. During the raising operation, after the boom has been lifted off the cushion plates 46, the roller 65, having rolled upon the side of the boom, will return to its normal position of Figure 4, the forked bracket 62 swinging in counterclockwise direction and the pin clutch again engaging the bevel gear 34, so that the platform starts to swing again, and swings back into a position at right angles and extending over the track while the boom is being raised. In the meantime the partitions 20 have swung down and, at the end of the operation of returning the stall gate into its operative position, the boom slightly tilts in a counterclockwise direction so that the lower ends of the partitions 20 come to rest on or even to sink into and to engage upon the soil 26 of the track. Set screws 72 allow adjustment of the distance to which the partitions hang down from the boom and thus the degree to which the partitions engage upon the ground can be changed to suit circumstances.

The three stages of positions assumed by the stall gate, when in operative position, after having been swung from the race track, and in a fully collapsed position, are shown in Figures 5 and 6, 7 and 8, and 9 and 10, respectively, the indication of the fence 67 in these various figures facilitating the observation of the respective positions of the stall gate in respect to the race track.

The full function of our stall gate represents a complex aggregate of various mechanical movements for each one of which a trained engineer can readily substitute a mechanically equivalent modification. It is therefore understood that we do not desire to have our invention interpreted strictly in the light of the accompanying drawings but we wish to protect its full scope, on the basis of the above, exemplary description, as laid down in the following claims.

We claim:

1. In a stall gate for jockey-ridden race horses, stalls, partitions laterally separating said stalls, and substantially horizontally disposed dash boards protruding from said partitions into said stalls at a level below that of the feet of a jockey mounted on a race horse, the surfaces of said dash boards extending at a downward incline from said partitions and being directed down at their point of furthest protrusion from said partitions.

2. In a stall gate, stalls, partitions laterally separating said stalls, a solid padding at the lower ends of said partitions and smooth dash boards protruding from said partitions into said stalls, the surfaces of said dash boards extending at a downward incline and merging into said padding below their point of furthest protrusion from said partitions.

3. In a stall gate, stalls, a screened frame vertically confining said stalls, screened partitions suspended from said frame, lower, curved ends on said partitions and padding extending up from said lower, curved ends and merging into said screened partitions.

4. A stall gate for race tracks, comprising a platform arranged beside the race track, a boom extending over said race track, partitions suspended from said boom onto said race track, and means mounted on said platform, operatively connected with said partitions and simultaneously folding said partitions onto said boom.

5. A stall gate for race tracks, comprising a platform arranged beside a race track, a boom extending from said platform over said race track, partitions suspended from said boom onto said race track, and operative means upon said platform adapted to collapse said partitions and said boom and to swing said boom from a position extending over the race track to a position beside said race track.

6. A stall gate for race tracks, comprising a platform rotatably arranged beside the race track, a boom extending from said platform over said race track, partitions liftably suspended from said boom onto said race track, and means operatively connected with said platform and said partitions, by means of which said platform and partitions may be simultaneously rotated and lifted, respectively.

7. In a stall gate for race tracks, a platform arranged, beside the race track, jibs extending upward from said platform, trough-shaped rails in said jibs, a boom movable along said rails in said jibs, partitions suspended from said boom onto said race track and means adapted to fold said partitions against said boom, to move said boom along said rails and to swing said boom from over the race track.

8. In a stall gate for race tracks, a platform arranged beside the race track, jibs extending upward from said platform, trough-shaped rails in said jibs, a boom movable along said rails in said jibs and extending over said race track, partitions suspended from said boom onto said race track, and operative means adapted to fold said partitions against said boom, to move said boom along said rails and to swing said boom from a position extending over the race track to a position beside said race track, said rails extending substantially rectilinearly at an incline and their upper ends being directed to extend in a substantially horizontal direction.

9. In a stall gate for race tracks, a platform arranged beside the race track, jibs collapsibly mounted upon said platform, trough-shaped rails in said jibs, a boom movable along said rails in said jibs and extending over said race track, partitions suspended from said boom onto said race track, means for supporting said boom upon said platform, when at its lowest position along said rails, said boom being disengaged from said rails when in said lowest position.

10. In a stall gate for race tracks, a platform arranged beside the race track, jibs mounted upon said platform, trough-shaped rails in said jibs, cam parts upon said jibs, a boom movable along said rails, partitions rotatably suspended from said boom, and a connection between said partitions which is operably engaged by said cam part.

11. A stall gate for race tracks, comprising a platform arranged beside the race track, jibs extending upward from said platform trough-shaped rails in said jibs, a boom movable along said rails in said jibs, partitions suspended from said boom onto said race track, a hoist mounted on said platform adapted to move said boom along said rails, and gearing adapted to rotate said platform around a vertical axis and operatively connected to said hoist.

12. A stall gate for race tracks, comprising a platform arranged beside the race track, jibs extending upward from said platform, trough-shaped rails in said jibs, a boom movable along said rails in said jibs, partitions suspended from said boom onto said race track, a hoist mounted on said platform adapted to move said boom along said rails, gearing adapted to rotate said platform around a vertical axis, an operative connection between said gearing and said hoist, and means, operable by said boom, adapted to temporarily sever said operative connection between said gearing and said hoist.

13. In a stall gate for race tracks, a platform arranged beside the race track, jibs fulcrumed upon said platform, trough-shaped rails in said jibs, a boom movable along said rails in said jibs and extending over said race track, partitions suspended from said boom, weights substantially balancing said jibs around their fulcrum, and weights substantially balancing the weight of said boom and said partitions around the point of support of said boom on said jibs.

Signed at New York in the county of New York and State of New York this 17th day of December, A. D. 1929.

ARTHUR E. BIRTWISTLE.
ANTON ROESER.